(12) United States Patent
Peddie

(10) Patent No.: US 9,616,984 B2
(45) Date of Patent: Apr. 11, 2017

(54) METHOD FOR OPERATION OF AN UNMANNED OCEAN VESSEL

(71) Applicant: TECOM AS, Bergen (NO)

(72) Inventor: David Peddie, Bergen (NO)

(73) Assignee: OffShore Sensing AS

( * ) Notice: Subject to any disclaimer, the term of this patent is extended or adjusted under 35 U.S.C. 154(b) by 0 days.

(21) Appl. No.: 14/770,100

(22) PCT Filed: Feb. 21, 2014

(86) PCT No.: PCT/NO2014/000020
§ 371 (c)(1),
(2) Date: Aug. 25, 2015

(87) PCT Pub. No.: WO2014/129907
PCT Pub. Date: Aug. 28, 2014

(65) Prior Publication Data
US 2016/0001861 A1 Jan. 7, 2016

(30) Foreign Application Priority Data

Feb. 25, 2013 (NO) .................................. 20130291

(51) Int. Cl.
*B63H 9/00* (2006.01)
*B63H 9/06* (2006.01)
(Continued)

(52) U.S. Cl.
CPC ............. *B63H 9/0607* (2013.01); *B63H 9/04* (2013.01); *B63H 25/04* (2013.01); *G05D 1/0206* (2013.01);
(Continued)

(58) Field of Classification Search
CPC ........ B63H 9/0607; B63H 9/04; B63H 25/04; G05D 1/0206
See application file for complete search history.

(56) References Cited

U.S. PATENT DOCUMENTS 3,691,978 A * 9/1972 Bond ................... G05D 1/0206
114/144 A
4,040,374 A * 8/1977 Greene ................ G05D 1/0206
114/144 C
(Continued)

OTHER PUBLICATIONS

International Search Report for PCT/NO2014/000020 mailed Apr. 24, 2014.
(Continued)

*Primary Examiner* — Stephen Avila
(74) *Attorney, Agent, or Firm* — Ben Schroeder Law, PLLC

(57) ABSTRACT

A method is described for steering of an un-manned ocean vessel (10), where the vessel comprises a hull (12), a self-tacking wing sail (16) for propulsion, a keel (18) for direction stability and a rudder (20). The method comprises the steps: to set the rudder (20) and the sail (16) so that the vessel (10) holds a stable direction with regard to the wind at a given rudder deflection, a) to check the position of the vessel (10) with the help of an electronic steering system (22) on board, and if it is registered that the vessel (10) is not getting any nearer its destination, b) adjust the rudder (20) to set a new, arbitrary course, where the course is chosen from among a number of pre-determined course changes, c) check again the position of the vessel (10) with the help of the electronic steering system (22) and if it is registered that the vessel (10) has got nearer its destination, d) to let the vessel (10) continue on the same course, and e) to repeat said check of the position of the vessel (10) and the steps a) to d) at regular intervals.

12 Claims, 1 Drawing Sheet

(51) Int. Cl.
  *B63H 25/04* (2006.01)
  *B63H 9/04* (2006.01)
  *G05D 1/02* (2006.01)
  *B63B 35/00* (2006.01)

(52) U.S. Cl.
  CPC ..... *B63B 2035/007* (2013.01); *B63B 2211/02* (2013.01)

(56) References Cited

U.S. PATENT DOCUMENTS

| | | | |
|---|---|---|---|
| 4,059,064 A * | 11/1977 | Dickey | G05D 1/0206 114/144 E |
| 4,564,909 A | 1/1986 | Kramer | |
| 4,785,404 A * | 11/1988 | Sims | G01C 21/203 114/144 E |
| 2007/0051292 A1 | 3/2007 | Kilbourn et al. | |
| 2009/0069962 A1 | 3/2009 | Aharon et al. | |
| 2009/0173263 A1 | 7/2009 | Ott et al. | |
| 2012/0290164 A1 | 11/2012 | Hanson et al. | |

OTHER PUBLICATIONS

Rynne P.F. et al., Development and Preliminary Experimental Validation of a Wind- and Solar-Powered Autonomous Surface Vehicle, Oct. 1, 2010, IEEE Journal of Oceanic Engineering, vol. 35, No. 4. Oct. 2010, pp. 971-983.

Elkaim G. H., System identification-based control of an unmanned autonomous wind-propelled catamaran, Jan. 1, 2009, Control Engineering Practice, vol. 17, No. I,2009, pp. 158-169.

Xiao, K. et al., A wind-independent control strategy for autonomous sailboats based on Voronoi diagram, WSPC—Proceedings, Jul. 15, 2011, pp. 109-123.

International Preliminary Report on Patentability for PCT/NO2014/000020 mailed Apr. 21, 2015.

Written Opinion for PCT/NO2014/000020 completed Apr. 15, 2014.

Fer, I. et al., "Near surface oceanographic measurements using the Sail Buoy", CMR-12-A10266-RA-2, Rev. 00, Dec. 14, 2012.

* cited by examiner

METHOD FOR OPERATION OF AN UNMANNED OCEAN VESSEL

This application claims priority under 35 USC §§365 and 371 to PCT/NO2014/000020, filed Feb. 21, 2014, which in turn claims priority to NO 20130291, filed Feb. 25, 2013, all of which are incorporated by reference in their entireties.

The present invention relates to a method for the steering of an unmanned ocean vessel, where the vessel comprises a hull, a self-tacking wing sail for propulsion, a keel for direction stability and a rudder.

The invention relates to an unmanned, self-propelled, surface water-going vessel for maritime use, further referred to as an unmanned ocean vessel (UOV). In particular, but not exclusively, the invention relates to an unmanned ocean vessel that uses renewable energy sources which make it possible to expand the operating period and operating area, such as for surveillance of remote lying ocean areas.

The military, public and commercial uses for a UOV within the context of warfare, exploration, studies and surveillance at sea are numerous. The possibility of conventional platforms, such as ships and buoys, for the collection of data and information within these contexts are limited, in particular when compared to the extent of the oceans of the world. Ships are costly to build, man and operate. Buoys, either fixed or floating, provide in general only limited coverage. Even if some additional information can now be collected at a distance by satellites, these are more costly and their sensors can provide very limited information about the oceans.

The sensors and instruments available to collect oceanographic information and information directly are well developed. It is clear that modern communication and information technology can be used in full to utilise the expanded network of instruments and sensors, such as described in U.S. Pat. No. 5,894,450 of Schmidt et al. However, it is desirable to have a cheap, mobile and self-maintaining platform that can provide energy and a connection for ocean monitoring, communication, studies and other applications that require endurance.

Conventional unmanned surface vessels, such as described in U.S. Pat. No. 5,713,293 of Shiffler et al., or the "surveillance" vessel of Spartan proposed by the US Navy Undersea Welfare Centre in Newport, R.I., USA, which typically uses conventional power units such as fossil fuel and which has a limited reach and endurance. Conventional unmanned surface vessels, at least when they operate in a semi self-propelling mode, are also exposed to the risk that arises from a collision or close contact with large vessels.

US 2007/0051292 A1 shows an unmanned ocean vessel with a propulsion system comprising a wing-formed sail that uses wind energy for propulsion, a keel for direction stability and a rudder for steering. The sail is placed on the vessel so that the aerodynamic force centre of the wing sail is placed in front of the hydrodynamic force centre of the keel. The vessel has an electronic steering system comprising GPS and a communication module to send and receive information and command signals. FER, I et al., "Near surface oceanographic measurements using the Sailbuoy", CMR-12-A10266-RA-2, Rev. 00, 2012 Dec. 14 shows a similar vessel.

XIAO, K, et al., "A wind-independent control strategy for autonomous sailboats based on Voronoi diagram", WSPC, 2011 Jul. 15 relates to a control strategy based on a Voronoi diagram for self-steering sailboats. A reference table is used to make the boat sail as planned. An approximation to control self-steering sailboats without information from wind sensors (with GPS data and compass only) is proposed.

The aim is to provide a more reliable method, as a sensor for detection of wind direction can break down at any time.

It is an object of the invention to provide an UOV for marine use that takes into account the disadvantages of the known unmanned surface vessel proposed for warfare, explorations, studies and surveillance situations at sea, preferred for extended periods and/or for larger operational areas.

It is a further object to provide a method for steering of an autonomous vessel for surveillance and registering in oceans, over either a predetermined course or in a predetermined area, as described later.

In a wide aspect the invention lies in an UOV for operation on the surface of a body of water, where said vessel comprises:

a closed hull that has a cargo room,
   a propulsion system that has energy collecting means and energy storing means set up to use solar energy, wind energy or wave energy,
   a number of sensors to register pre-determined environmental parameters or other parameters, and
   a communication system to transfer information from said sensors about the chosen parameters to, and to receive command signals from, one or more remote lying stations and/or cooperative UOVs.

The above mentioned object are achieved with a method for steering of an unmanned ocean vessel, where the vessel comprises a hull, a self-tacking wing sail for propulsion, a keel for directional stability and a rudder, where the method comprises the steps:

to set the rudder and the sail so that the vessel holds a stable direction with regard to the wind at a given rudder deflection,
   a)—to check the position of the vessel with the help of an electronic steering system on board and if it is registered that the vessel is not any closer to its destination,
   b)—adjust the rudder to set a new, arbitrary course, where the course is chosen among a number of pre-determined course changes,
   c)—check again the position of the vessel with the help of the electronic steering system and if it is registered that the vessel has got nearer its destination,
   d)—to let the vessel continue on the same course, and
   e)—to repeat said check of the position of the vessel and the steps a) to d) at regular intervals.

A position check and any one or more of the steps a) to d) can be repeated at regular intervals of more than 15 minutes.

Said arbitrary course can be limited in advance to a couple or a few course changes.

The destination can be a chosen position within a limited area where it is desirable that the vessel finds itself in.

To operate the vessel with the use of wind energy, the wing sail can be formed with a foil collocation.

Furthermore, the wing sail can be placed on the vessel so that the aerodynamic force centre of the wing sail is placed in front of the hydrodynamic force centre of the keel. The wing sail can also be formed so that a lift generated by the wind increases gradually up to an angle of attack of 15 degrees.

In addition, the wing sail can be self-tacking with a fixed deflection from the centre position to each side.

The rudder can be formed so that the moment generated by the rudder onto the vessel increases in proportion to the rudder deflection. Furthermore the rudder can be formed so that the moment generated from the rudder on the vessel increases in proportion with the speed.

The placing and shape of the rudder, keel, sail and hull can be made so that the vessel keeps a stable direction with regard to the wind at a given rudder deflection.

The vessel can be equipped with an electronic steering system comprising GPS, communication module, etc., to send/receive information and command signals, and also equipment for the regulation of the rudder and the sail.

The pre-determined course changes can comprise three course changes, such as a first course which is into the port wind, a second course which is into the starboard wind and a third course which is with the wind.

An unmanned vessel that is described in connection with the invention can have a series of application areas and some non-limiting application areas can be as follows: The vessel can, for example, be fitted with sensors for the measurement of water and air, wave movement, current, sun rays, etc., over a given distance or in a given area. The vessel can be used to communicate ultrasonically with submerged equipment (for example, to function as a relay station). The vessel can be used for long term surveillance (readily for several months).

The vessel can also be used in areas that are regarded as dangerous for personnel, for example, areas with volcanic activity, war zones, areas with gas discharges, etc. Furthermore, the vessel can be equipped with listening equipment to warn of boat traffic (for example, to prevent illegal immigration, smuggling, etc.) and the vessel can be equipped with listening devices to detect marine mammals or other marine organisms.

The invention shall now be described in more detail with the help of the enclosed figures, in which.

Figure 1:
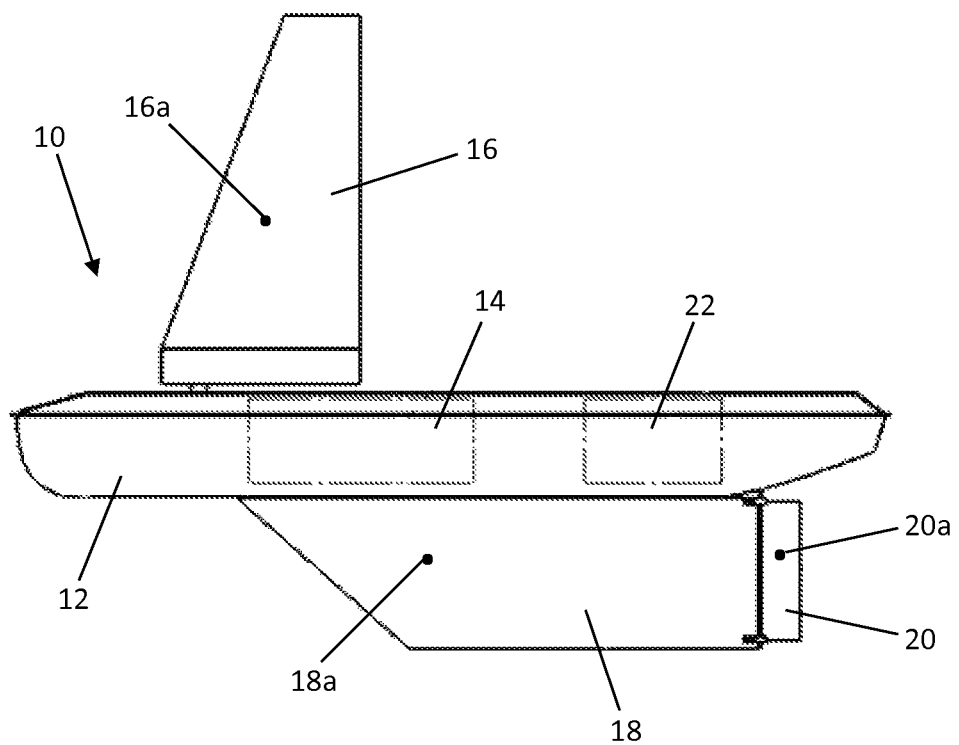
FIG. 1 shows a principle outline of an unmanned vessel according to the invention seen from the side.

The outline of the vessel only shows an example of an embodiment, and shows an unmanned, self-propelled and surface water operating vessel 10 (UOV) for marine use arranged for operation on the surface of a body of water. Said vessel comprises preferably a closed hull 12 that has a cargo room 14, a self-tacking wing sail 16 for propulsion, a keel 18 for directional stability, a rudder 20 for steering and an electronic steering system 22 that can encompass steering means, GPS, communication module, etc., to send/receive information and command signals. The communication can go via satellite communication or other suitable communication means.

The propulsion of the vessel is in principle only based on wind, but the vessel can alternatively also be equipped with an engine and propeller for use in certain situations or in an emergency. Energy collectors such as solar panels can be mounted on the vessel to prolong the lifetime of the electronic systems and equipment on board.

The idea of the present vessel is the possibility to steer or sail the vessel without the use of a conventional autopilot. By setting the sail 16 and rudder 20 in a fixed position and in pre-determined positions or angles, the vessel 10 will stay on a fixed course with regard to the wind, in contrast to a conventional autopilot or self-steering that will constantly adjust the angle of the rudder to keep the vessel on a steady course.

The determined sailing direction with regard to the wind based on a fixed rudder and sail is obtained in that this can be set based on estimated points of attack 20a,16a,18a for the forces on rudder 20, sail 16, keel 18, respectively, so that the vessel 10 sails in the direction which gives an equilibrium between the forces. Furthermore, the point of attack on the sail is in front of the point of attack on the keel, so that leeward steering is achieved, where the fixed angle of the rudder compensates for this leeward steering. The given points of attack in FIG. 1 are only meant as examples, and will be dependent on the shape of the hull, sail and rudder.

Rudder, sail, keel and hull are consequently formed so that the vessel 10 stays on a steady course with respect to the wind at a given rudder deflection.

The sail 16 that is used is preferably a wing sail which has a foil collocation to drive the vessel with the use of wind energy. The wind sail is placed so that the aerodynamic force centre 16a (point of attack) of the wing sail is placed in front of the hydrodynamic force centre 18a (point of attack) of the keel. Furthermore, the wing sail can have a shape so that the sail has an increasing force at an increasing angle of attack, i.e. that lift, for example, generated by the wind is gradually increasing up to, or for that matter above, an angle of attack of 15 degrees.

Figure 2:
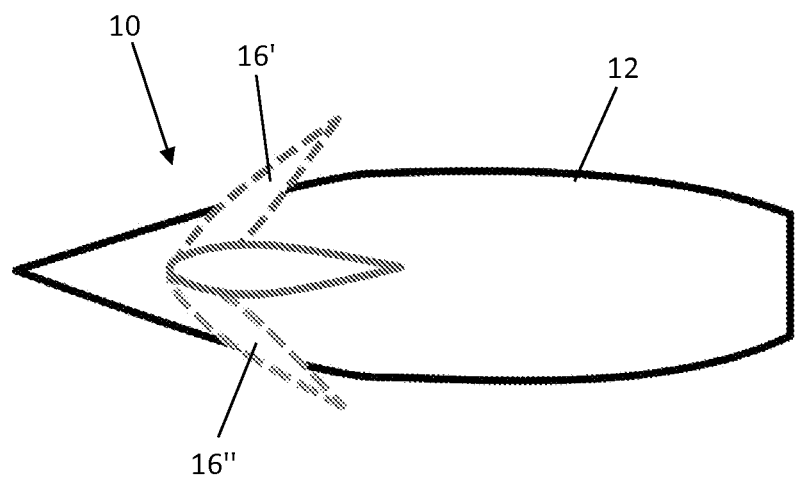
FIG. 2 shows a principle outline of the unmanned vessel seen from above.

As FIG. 2 shows, the wing sail 16 can be self-tacking with a fixed deflection from the centre position to each side 16' 16". Normally, this is obtained in that the sail can rotate feely around the mast and that a splice limits the deflection to each side. Furthermore, the rudder 20 can have a shape such that the moment generated from the rudder onto the vessel increases in proportion to the rudder deflection, alternatively or in addition, the rudder 20 can have a form such that the moment generated from the rudder onto the vessel increases in proportion with the speed.

Thus, with the correct placing and shape of the rudder, sail, keel and hull the vessel will hold a steady direction with respect to the wind at a given rudder deflection.

During sailing the rudder will try, as it is set at a given angle, to rotate the vessel into the wind. As the point of attack for the forces on the sail lies in front of the point of attack for the forces on the keel, the force that pushes onto the sail will try to turn the vessel away from the wind. Therefore, the vessel 10 will sail in the direction where these two forces are in equilibrium. The force from the rudder is dependent on the speed of the vessel, while the force from the sail is dependent on the angle of attack of the wind. When the angle of attack on the sail is large the speed of the vessel will increase, which causes the force of turning from the rudder to increase. Thus, the rudder will force the vessel up into the wind and cause the angle of attack on the sail to be reduced, whereupon the sail loses force and the vessel speed decreases, something which reduces the force of turning from the rudder. The wind resistance on the hull and sail will force the vessel to deflect from the wind which increases the angle of attack of the sail and the speed of the vessel. This will thereafter increase the force from the rudder and push the vessel up into the wind.

Thus, the vessel 10 will be able to sail in a given direction as explained above, towards a pre-determined destination. During the sailing the vessel will be able to check its own position with the help of the electronic steering system 22 on board and if it is registered that the vessel has not got any nearer its destination with respect to previous position locations, the rudder, or for that matter, the sail, will be able to be regulated to set a new course, where the course, in a sense, is arbitrary but generally limited to some predetermined course changes. The predetermined course changes can, for example, be a couple of course changes, or three or four pre-determined course changes. It is not the aim that there shall be a number of consecutive course changes as in prior art. With the next position check the procedure is repeated and if the vessel is now getting closer to its destination it can continue on the same course, if not, the course is changed as described. In this way the course does not change very often, for example, it may be 15 minutes, 30 minutes, 60 minutes or more between each position check.

In practice, the pre-determined course changes can be, in the main, three courses, even if, as mentioned, more courses can also be chosen in advance. This can be, for example, a first course which is into the port wind, a second course which is into the starboard wind and a third course which is with the wind. Thus, these three courses can make up a "star" where one of the three courses will always lead the vessel towards its destination or keep the vessel within a given area.

As the wind normally does not change much within some course changes one can find the course that is the best and stay on this. In principle, it is trial and error which is the algorithm, but information from experience can also possibly be used. The algorithm has a series of improvements that are included. The most essential is to take care of the direction/speed of previous courses (historical data) and use this to choose a new course.

The result is in a sense that the vessel will, in this way, sail in a criss-cross manner before it reaches its destination and, in this way, will use more time for the travel. However, time is not always an important factor. With sampling at sea, for example, for the collection of oceanographic information, it is essential that the vessel covers a given area or stays on a pre-determined course towards its destination, or return location, for that matter. In other cases it is desirable that the vessel is in or stays within a given demarcated area, such as, for example, surveillance of environmental factors such as oil leaks in connection with offshore activities, or other surveillance activities, where time is of no significance.

With a such autonomous vessel as described, it will be able to remain in operation for a very long time with a very low energy consumption, possibly for several months or years. The low energy demand that is required can easily be provided by solar panels or the like.

The invention claimed is:

1. Method for steering of an un-manned ocean vessel, said vessel comprises a hull, a self-tacking wing sail for propulsion, a keel for direction stability, and a rudder, the wing sail is placed on the vessel so that the aerodynamic force centre of the wing sail is placed in front of the hydrodynamic force centre of the keel, wherein said method comprises the steps:
    setting the rudder and the sail to maintain the vessel in a stable direction with regard to the wind at a given rudder deflection;
    a)—checking the position of the vessel using an electronic steering system on board, and if it is registered that the vessel is not getting any nearer its destination;
    b)—adjusting the rudder to set a new, arbitrary course, where the course is chosen among a number of pre-determined course changes;
    c)—checking again the position of the vessel using the electronic steering system, and if it is registered that the vessel has got nearer its destination;
    d)—letting the vessel continue on the same course; and
    e)—repeating said position check of the vessel and steps a) to d) at regular intervals.

2. Method according to claim 1, wherein the position check and possibly one or more of the steps a) to d) are repeated at regular intervals of over 15 minutes.

3. Method according to claim 1, wherein said arbitrary courses are limited to a few pre-determined course changes.

4. Method according to claim 1, wherein the destination is a chosen position within a limited area, where it is desirable for the vessel to be.

5. Method according to claim 1, wherein, to drive the vessel with the use of wind energy, the wing sail is being formed with a foil collocation.

6. Method according to claim 1, wherein the wing sail is being formed so that a lift is generated by the wind, gradually increasing up to an angle of attack of 15 degrees.

7. Method according to claim 1, wherein the wing sail is self-tacking with a fixed deflection from the centre position to each side.

8. Method according to claim 1, wherein the rudder is formed so that the moment generated by the rudder on the vessel increases in proportion to the rudder deflection.

9. Method according to claim 1, wherein the rudder is being formed so that the moment generated by the rudder on the vessel increases in proportion to the speed.

10. Method according to claim 1, wherein the placing and shape of the rudder, keel, sail and hull are being made so that the vessel holds a stable direction with regard to the wind at a given rudder deflection.

11. Method according to claim 1, wherein the vessel (10) is equipped with an electronic steering system (22) comprising GPS, and a communication module, to send/receive information and command signals, and said vessel is also equipped with equipment for regulation of the rudder and sail.

12. Method according to claim 1, wherein the pre-determined course changes comprise three course changes, such as a first course which is into the port wind, a second course which is into the starboard wind and a third course which is with the wind.

* * * * *